United States Patent [19]

Clark, II

[11] Patent Number: 5,399,663

[45] Date of Patent: Mar. 21, 1995

[54] POLY(ETHERAMIDE) SEGMENTED BLOCK COPOLYMERS

[75] Inventor: Richard J. Clark, II, Austin, Tex.

[73] Assignee: Huntsman Corporation, Salt Lake City, Utah

[21] Appl. No.: 46,289

[22] Filed: Apr. 15, 1993

[51] Int. Cl.$^6$ .............................................. C08G 69/26
[52] U.S. Cl. ................... 528/340; 528/338; 528/339; 528/347
[58] Field of Search .............. 528/340, 339, 338, 347

[56] References Cited

U.S. PATENT DOCUMENTS

| | | | |
|---|---|---|---|
| 2,359,867 | 10/1944 | Martin | 528/340 |
| 5,053,484 | 10/1991 | Speranza et al. | 528/338 |
| 5,086,162 | 2/1992 | Speranza et al. | 528/339 |

OTHER PUBLICATIONS

*Chemical Abstracts*, vol. 31:769 9 ¶ 6/(1946).
S. Iwabuchi, et al., "Darstellung und Eigenschaften von Copolyamiden mit Oxyethylenegruppen in definierter Sequenz," *Makromol Chem.*, vol. 183, 6/(1982) pp. 1427–1433, Summary.
J. R. Flesher, Jr., "Polyether Block Amide: High Performance TPE," *Modern Plastics*, Sep., 1987, pp. 100–110.

*Primary Examiner*—John Kight, III
*Assistant Examiner*—P. Hampton-Hightower
*Attorney, Agent, or Firm*—Russell R. Stolle; David L. Mossman

[57] ABSTRACT

An amine terminated random copolymer containing ethylene oxy/propylene oxy segments may be reacted with hexamethylene diamine and adipic acid monomers to make improved poly(etheramide) segmented block copolymers. Ordinarily, poly(propylene glycol) diamines tend to phase separate under these conditions and polyamide-6,6 could not be so modified. The resultant poly(etheramide) segmented block copolymer has improved impact performance, reduced modulus and lower glass transition as contrasted with the non-modified polyamide-6,6.

17 Claims, No Drawings

POLY(ETHERAMIDE) SEGMENTED BLOCK COPOLYMERS

FIELD OF THE INVENTION

The invention relates to novel polyamides, and, in one aspect, more particularly relates to novel poly(etheramide) segmented block copolymers made by reacting a dicarboxylic acid with an alkylene diamine and poly(propylene glycol) diamines, the latter being made soluble by the incorporation of ethylene oxide therein.

BACKGROUND OF THE INVENTION

It is, of course, known to react materials having primary amine groups, with compounds having carboxylic acid groups to produce polyamides.

U.S. Pat. No. 2,359,867 teaches polymers having a high receptivity for acid dyes, which polymers are the reaction product of 75 to 95 parts by weight of a mixture of hexamethylene diamine and adipic acid in substantially equal proportions, and 5 to 25 parts by weight of a polyamide-forming composition selected from the class of (a) mixtures of diamine and dibasic carboxylic acid in substantially equimolecular proportions, and (b) monoaminomonocarboxylic acids. The polyamide-forming composition has a bifunctional polyamide-forming reactant containing at least one oxygen atom in the chain of atoms separating its amide-forming groups. Such polyamide forming reaction may include compounds of the formula $NH_2—(CH_2CH_2O)_x—CH_2CH_2—NH_2$, where x is from 2 to 3. Also of interest is S. Iwabuchi, et al., "Darstellung und Eigenschaften von Copolyamiden mit Oxyethylenegruppen in definierter Sequenz," *Makromol. Chem.*, Vol. 183, (1982) pp. 1427–1433. The summary to the article indicates that polyamides of the formula:

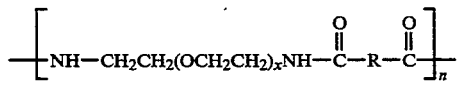

were synthesized from α, ω-diamino-substituted oligo-(oxyethylene)s and bis-chlorides of dicarboxylic acids. The copolymers contained up to five oxyethylene units per repeating unit, and properties like solubility, thermal stability and complexing ability towards alkali metal cations were influenced.

See also *Chemical Abstracts,* Vol. 31:769 ¶ 9 (1946) reporting Great Britain Patent 562,370 which describes a mixture of at least two preformed synthetic linear polyamides heated in the molten state at amide-forming temperatures until a homogeneous melt blend was obtained. At least one of the polyamides should be soluble in water and the other insoluble. The insoluble polyamide may be polyhexamethylene adipamide. The soluble polyamide may be one in which heteroatoms of oxygen or sulfur are present in the main polyamide chain, such as polytriglycol adipamide and N-methylpolytriglycol adipamide. The resultant polyamides had increased water-absorption properties and other improved properties.

A good, general background article about some of these amide materials is J. R. Flesher, Jr., "Polyether Block Amide: High-Performance TPE," *Modern Plastics,* September, 1987, pp. 100–110, where the family of engineering-grade thermoplastic elastomers based on block copolymers of polyethers and polyamides is discussed.

Also of interest is U.S. Pat. No. 5,086,162 to George P. Speranza and Wei-Yang Su of Texaco Chemical Company which describes novel polyether amides produced by reacting at least one polyalkylene glycol diamine with at least two dicarboxylic acids or esters thereof. The polyethylene glycol diamine has the formula $NH_2—(CH_2CH_2O)_x—CH_2CH_2—NH_2$, where x ranges from 2 to 6, and at least one of the dicarboxylic acids is an aromatic dicarboxylic acid. These novel polyether amides may have the formula:

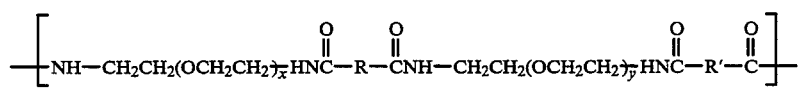

where each R and R′ are independently an alkyl or aryl moiety having from 3 to 34 carbon atoms, where at least one R or R′ is an aryl moiety, and where each x and y independently have the values noted. Suitable dicarboxylic acids include adipic acid, azelaic acid, sebacic acid, dodecanedioic acid, terephthalic acid, isophthalic acid, t-butyl isophthalic acid, and mixtures thereof. Suitable diamines include triethylene glycol diamine (JEFFAMINE® EDR-148 amine) and tetraethylene glycol diamine (JEFFAMINE® EDR-192 amine), among others. The resulting polyether amides are useful to make polymers, including fibers, with unusually good water absorbancy properties. The methods of this patent successfully incorporate triethylene glycol diamine and aromatic dibasic acids, where this cannot be accomplished directly.

Past research related to that described above has shown that it is not possible to incorporate higher molecular weight poly(propylene glycol) diamines into polyamide-6,6 segmented block copolymers; where higher molecular weight is defined as greater than 400 gm/mol. This is true despite the fact that poly(ethylene glycol) diamines have been readily incorporated, as described above. Poly(propylene glycol) diamines such as JEFFAMINE® D2000 diamine (Mw≈2000) are not soluble in the monomers that are building blocks for polyamide-6,6 (hexamethylene diamine/adipic acid). The diamines tend to phase separate from the hexamethylene diamine/adipic acid in the polymerization reactor. The diamines thus cannot be efficiently incorporated into polyamide-6,6 to produce a polyetheramide-6,6 segmented block copolymer. There exists a need for way to incorporate these diamines into these polyamides.

SUMMARY OF THE INVENTION

Accordingly, it is an object of the present invention to provide novel polyether amides with polyether segments derived from poly(propylene glycol)/poly(ethylene glycol) diamines and polyamide segments. These poly(etheramide) segmented block copolymers are expected to have improved impact performance and reduced modulus as compared with those without the polypropylene glycol segments. The glass transition temperature of the polyetheramide was also significantly lower than expected.

It is another object of the present invention to provide way to incorporate poly(propylene glycol)-/poly(ethylene glycol) diamines into polyamide-6,6.

In carrying out these and other objects of the invention, there is provided, in one form, novel poly(etheramide) segmented block copolymers produced by a process involving reacting at least one poly(alkylene glycol) diamine having the formula:

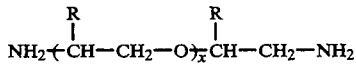

where x is at least 6, R is independently hydrogen or an alkyl of one to four carbon atoms with the proviso that at least 50% of the R groups are hydrogen and the poly(alkylene glycol) diamine has a $M_w$ of at least 400 with at least one dicarboxylic acid or ester thereof and at least one alkylene diamine different from the further alkoxylated poly(alkylene glycol) diamine.

DETAILED DESCRIPTION OF THE INVENTION

It has been discovered that poly(etheramide) segmented block copolymers may be made by reacting poly(alkylene glycol) diamines, specifically poly(ethylene glycol)/poly(propylene glycol) (PEG/PPG) diamines with the alkylene diamine/dicarboxylic acid monomer mixture. In one embodiment, the ethylene glycol (EG) and propylene glycol (PG) segments are distributed randomly, although they could be in blocks. Thus, the PEG/PPG-based diamines can be efficiently incorporated in polyetheramide-6,6 segmented block copolymer due to increased solubility of the polyether diamine in the hexamethylene diamine/adipic acid mixture. It is believed that these new materials have improved impact performance and reduced modulus. They have significantly lower glass transition temperature relative to polyamide-6,6 without this polyether incorporation.

The problem of solubility of the poly(propylene glycol) diamines in the polyamide monomers does not exist with the prior copolymers which use only poly(ethylene glycol) diamines. It was unexpected that an already existing insoluble poly(propylene glycol) diamine could be modified sufficiently by ethylene oxide addition to render it soluble to the required degree in the polyamide-forming monomers, namely, the dicarboxylic acid (adipic acid, e.g.) and alkylenediamine (hexamethylene diamine, e.g.).

The polyamides modified according to the method and composition of this invention may be any of those commonly formed by the reaction of an alkylene diamine and a dicarboxylic acid. In these broad definitions, the alkylene diamine may have a $M_w$ of from about 88 to about 266, and the dicarboxylic acid may have a molecular weight ($M_w$) of from about 146 to about 216. It is apparent that the alkylene diamine used to form the polyamide is not the poly(alkylene glycol) diamine reactant of this invention described in detail later. Examples of suitable alkylene diamines include ethylene diamine, hexamethylene diamine, tetramethylene diamine, dodecane diamine, etc. While the alkylene diamine used to form the polyamide may include ether groups, such as a poly(ethylene glycol) diamine, used in U.S. Pat. No. 5,086,162, e.g., incorporated by reference herein; poly(propylene glycol) diamines and diamines containing higher alkylene glycol units are not encompassed herein, though they do fall within the poly(alkylene glycol) diamine definitions given below.

Suitable dicarboxylic acids include, but are not necessarily limited to adipic acid, pimelic acid, azelaic acid, sebacic acid, dodecanedioic acid, terephthalic acid, isophthalic acid, t-butyl isophthalic acid and mixtures thereof. The esters and anhydrides of these acids may also be used. It is also preferred, in one embodiment, that the dicarboxylic acid not possess other reactive groups than the acid groups, at least groups that readily react with primary amine functionalities.

The preparation of the polyamides is well known in the art, particularly polyamide-6,6. These techniques may be used in the method herein. Polyamide-6,6 is also commonly known as 66 nylon or poly(hexamethylene adipamide). See, for example, the college text F. W. Billmeyer, Jr., *Textbook of Polymer Science, Second Edition*, Wiley-Interscience, 1971, pp. 433–437. Indeed, the preferred alkylene diamine is hexamethylene diamine and the preferred dicarboxylic acid is adipic acid. However, it will be understood that mixtures of more than one alkylene diamine and mixtures of more than one dicarboxylic acid within the scope of these definitions may be used to affect the properties of the resulting poly(etheramide).

The poly(alkylene glycol) useful in this invention has the formula:

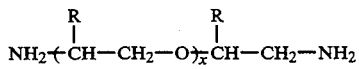

where x is at least 6, R is hydrogen or a lower alkyl of one to four carbon atoms. This diamine must have at least 50% of the R groups as hydrogen indicating ethylene glycol moieties, and at least one of the R groups should be lower alkyl indicating at least one propylene glycol, butylene glycol, etc. moiety. In a preferred embodiment of the invention, R is methyl, thus making the poly(alkylene glycol) diamine a poly(ethylene glycol)-/poly(propylene glycol) diamine. Also, x preferably averages from about 6 to about 70. It will be appreciated that throughout this description x is understood to be an average value of the distribution of polymers present. The mixed poly(alkylene glycol) diamine has a $M_w$ of at least 400. One specific preferred poly(alkylene glycol) diamine is a poly(ethylene glycol)/poly(propylene glycol) diamine having a $M_w$ of about 2000 gm/mol. More than one poly(alkylene glycol) diamine within this definition may be used as desired to affect the properties of the final poly(etheramide).

The ratio of ethylene oxide (EO) to propylene oxide (PO) may range from about 50:50 to about 95:5, preferably from about 50:50 to about 90:10 and most preferably from about 60:40 to about 80:20. The solubility of the resulting further alkoxylated poly(alkylene glycol) diamine in the polyamide monomers in general increases with increasing EO content. However, the water absorption of the resulting poly(etheramide) copolymer is also increased with increasing EO content. Thus, one of ordinary skill in the art will have to arrive at a balance between these considerations in determining the EO amount to be used, within the guidelines given here. While the addition of only EO might achieve the necessary solubility improvement, by using both EO and PO a balance between these considerations may be achieved. Further, while the EO and PO could be added in blocks, it is preferred that they be added randomly, that is, added as a mixture, rather than separately.

The polyamide monomers and the poly(alkylene glycol) diamine may be reacted together at a temperature in the range of about 250° C. to about 300° C. There are no particular pressure requirements for this step; the reaction may be conducted at atmospheric pressure. In one embodiment of the invention, the polyamide monomers are from about 95 to about 60 wt. % of the final poly(etheramide) segmented block copolymer, while the mixed poly(alkylene glycol) diamine is from about 5 to about 40 wt. %. More preferably, the polyamide monomers are from about 90 to 70 wt. % and the poly(alkylene glycol) diamine is from about 10 to about 30 wt. %. This ratio may be adjusted within wide parameters in accordance with the properties desired by the resulting poly(etheramide) segmented block copolymer. No catalyst is required for this reaction, although one may be yet discovered that might prove beneficial. The reaction is quite selective, yielding the poly(etheramide) segmented block copolymer in nearly quantitative yield. The products are generally light-colored solids. The products and methods of this invention will be described in more detail with reference to the following Examples, the results of which are presented in Table I.

TABLE I

Preparation of Poly(etheramide) Segmented Block Copolymers

| Ex. | Polyamide-6,6, wt. % | Polyether diamine, wt. % | EO/PO ratio of polyether diamine, wt. % | $T_g$, °C. | $T_m$, °C. |
|---|---|---|---|---|---|
| 1 | 89 | 11 | 40/60 | — | 252 |
| 2 | 89 | 11 | 20/80 | — | 253 |
| 3 | 60 | 40 | 40/60 | −69 | 254 |
| 4 | 52 | 48 | 40/60 | −72 | 240 |
| 5 | 60 | 40 | 20/80 | −69 | 254 |
| 6[1] | 60 | 40 | 0/100 | −64 | 250 |
| 7 | 60 | 40 | 60/40 | −63 | 254 |
| 8 | 60 | 40 | 40/60 | −67 | 255 |
| 9 | 60 | 40 | 40/60 | −67 | 252 |
| 10 | 60 | 40 | 20/80 | −69 | 249 |
| 11 | 60 | 40 | 40/60 | −68 | 251 |
| 12 | 60 | 40 | 20/80 | −68 | 251 |
| 13[2] | 60 | 40 | BD2004[3] | −67 | 247 |
| 14 | 60 | 38[4] | 40/60 | — | — |

[1]Comparative example.
[2]Comparative example.
[3]JEFFAMINE BD2004 is a poly(1,2-butylene glycol) diamine.
[4]Also present was 2 wt. % of JEFFAMINE T-403.

EXPERIMENTAL PROCEDURE

EXAMPLE 5

Although the following describes the procedure used for Example 5, the procedure for inventive Examples 1–4 and 7–12 and comparative Examples 6 and 13 was identical thereto except for the particulars shown in Table I.

Three hundred (300) gm of deionized water, 309.5 gm of adipic acid, 225 gm hexamethylene diamine, 360 gm of a 2000 gm/mol polyether diamine with 20%EO/80-%PO random polyether segment and 0.2 wt. % hindered phenol stabilizer were mixed together. The PEG/PPG diamine proportion was thus 38 wt. %. The resulting slurry was added to a two liter, stirred reactor. The reactor was reassembled and purged with purified nitrogen for 30 minutes. The nitrogen valves were closed to seal the reactor. The reactor was heated to 250° C. and held under pressure for one hour. The pressure was vented until the internal reactor pressure was atmospheric. The reactor was purged for two hours with purified nitrogen. The polymer was extruded under pressure through a valve on the bottom of the reactor into a water bath.

EXAMPLE 14

Three hundred (300) gm of deionized water, 309.5 gm of adipic acid, 225 gm hexamethylene diamine, 351 gm of a 2000 gm/mol polyether diamine with 40%EO/60-%PO random polyether segment, 9 gm JEFFAMINE T-403 amine and 0.5 wt. % hindered phenol stabilizer were added to a stirred round bottom reactor. The resulting slurry was added to a two liter, stirred reactor. The reactor was reassembled and purged with purified nitrogen for 30 minutes. The nitrogen valves were closed to seal the reactor. The reactor was heated to 250° C. and held under pressure for one hour. The pressure was vented until the internal reactor pressure was atmospheric. The reactor was purged for one hour with purified nitrogen, and then the reactor was placed under vacuum for two hours. The polymer was then extruded under pressure through a valve on the bottom of the reactor into a water bath.

Referring to Table I, comparative Examples 6 and 13 using no additional ethylene oxide, had an oily feeling. The liquid is polyether diamine which had not been incorporated into the polyamide-6,6 during the polymerization. It appears that the polyether diamine phase separated from the polyamide-6,6 monomers (adipic acid and hexamethylene diamine). Little or no liquid was observed on the surface of the polyamide-6,6 that contains the mixed ethylene oxide/propylene oxide polyether diamines.

Many modifications may be made in the process of this invention without departing from the spirit and scope thereof which are defined only in the appended claims. For example, one skilled in the art may discover that particular reaction conditions, sequences, diamines, dicarboxylic acids, and poly(alkylene glycol) diamines which may not be explicitly recited herein, but which are nevertheless anticipated, would give optimal or otherwise desirable results.

We claim:

1. A poly(etheramide) segmented block copolymer produced by a process comprising:
   (a) reacting at least one poly(alkylene glycol) diamine having the formula:

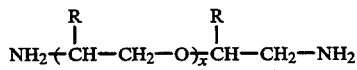

where x is at least 6, R is independently hydrogen or lower alkyl of one to four carbon atoms, where at least 50% of the R groups are hydrogen and at least one R is lower alkyl and the poly(alkylene glycol) diamine has a $M_w$ of at least 400 with
   (b) a mixture of
      (i) at least one dicarboxylic acid, ester or anhydride thereof and
      (ii) at least one alkylene diamine of the formula $H_2N(CH_2)_nNH_2$ where n ranges from 2 to 12,
where the poly(alkylene glycol) diamine is soluble in the mixture because at least 50% of the R groups are hydrogen.

2. The poly(etheramide) segmented block copolymer of claim 1 where the dicarboxylic acid is adipic acid and the alkylene diamine is hexamethylene diamine.

3. The poly(etheramide) segmented block copolymer of claim 1 where at least 50% of the R groups are hydrogen and at least one R is methyl and x ranges from about 6 to about 70.

4. The poly(etheramide) segmented block copolymer of claim 3 where in the poly(alkylene glycol) diamine the ratio of R being hydrogen and R being methyl ranges from about 50:50 to about 95:5.

5. The poly(etheramide) segmented block copolymer of claim 1 where the proportion of dicarboxylic acid and alkylene diamine, total, wt. % is from about 95 to about 60 wt. % and the proportion of poly(alkylene glycol) diamine wt. % is from about 5 to about 40 wt. %.

6. The poly(etheramide) segmented block copolymer of claim 1 where the reacting is at a temperature in the range of about 250° C. to about 300° C.

7. A poly(etheramide) segmented block copolymer produced by a process comprising:
(a) reacting at least one poly(alkylene glycol) diamine having the formula:

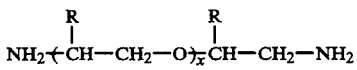

where x is at least 6, R is independently hydrogen and methyl, where at least 50% of the R groups are hydrogen, the balance being methyl and the poly(alkylene glycol) diamine has a $M_w$ of at least 400 with
(b) a mixture of
   (i) at least one dicarboxylic acid, ester or anhydride thereof and
   (ii) at least one alkylene diamine selected from the group consisting of ethylene diamine, propylene diamine, tetramethylene diamine, pentamethylene diamine, hexamethylene diamine, heptamethylene diamine, octamethylene diamine, nonamethylene diamine, decane diamine, undecane diamine and dodecane diamine, at a temperature in the range of about 250° C. to about 300° C. where the poly(alkylene glycol) diamine is soluble in the mixture because at least 50% of the R groups are hydrogen.

8. The poly(etheramide) segmented block copolymer of claim 7 where the dicarboxylic acid is adipic acid and the alkylene diamine is hexamethylene diamine.

9. The poly(etheramide) segmented block copolymer of claim 7 where x ranges from about 6 to about 70.

10. The poly(etheramide) segmented block copolymer of claim 7 where in the poly(alkylene glycol) diamine the ratio of R being hydrogen and R being methyl ranges from about 50:50 to about 95:5.

11. The poly(etheramide) segmented block copolymer of claim 7 where the proportion of dicarboxylic acid and alkylene diamine, total, wt. % is from about 95 to about 60 wt. % and the proportion of poly(alkylene glycol) diamine wt. % is from about 5 to about 40 wt. %.

12. A process for producing a poly(etheramide) segmented block copolymer by:
(a) reacting at least one poly(alkylene glycol) diamine having the formula:

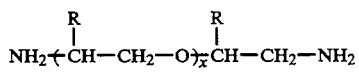

where x is at least 6, R is independently hydrogen or lower alkyl of one to four carbon atoms, where at least 50% of the R groups are hydrogen and at least one R is lower alkyl and the poly(alkylene glycol) diamine has a $M_w$ of at least 400 with
(b) a mixture of
   (i) at least one dicarboxylic acid, ester or anhydride thereof and
   (ii) at least one alkylene diamine selected from the group consisting of ethylene diamine, hexamethylene diamine, tetramethylene diamine and dodecane diamine where the poly(alkylene glycol) diamine is soluble in the mixture because at least 50% of the R groups are hydrogen.

13. The process of claim 12 where the dicarboxylic acid is adipic acid and the alkylene diamine is hexamethylene diamine.

14. The process of claim 12 where the R groups that are not hydrogen are methyl and x ranges from about 6 to about 70.

15. The process of claim 14 where in the poly(alkylene glycol) diamine the ratio of R being hydrogen and R being methyl ranges from about 50:50 to about 95:5.

16. The process of claim 12 where the proportion of dicarboxylic acid and alkylene diamine, total, wt. % is from about 95 to about 60 wt. % and the proportion of poly(alkylene glycol) diamine wt. % is from about 5 to about 40 wt. %.

17. The process of claim 12 where the reacting is at a temperature in the range of about 250° C. to about 300° C.

* * * * *